H. M. FREEMAN, J. LOWE, & J. F. STEVENS.
Wheel-Plows.
No. 134,878. Patented Jan. 14, 1873.
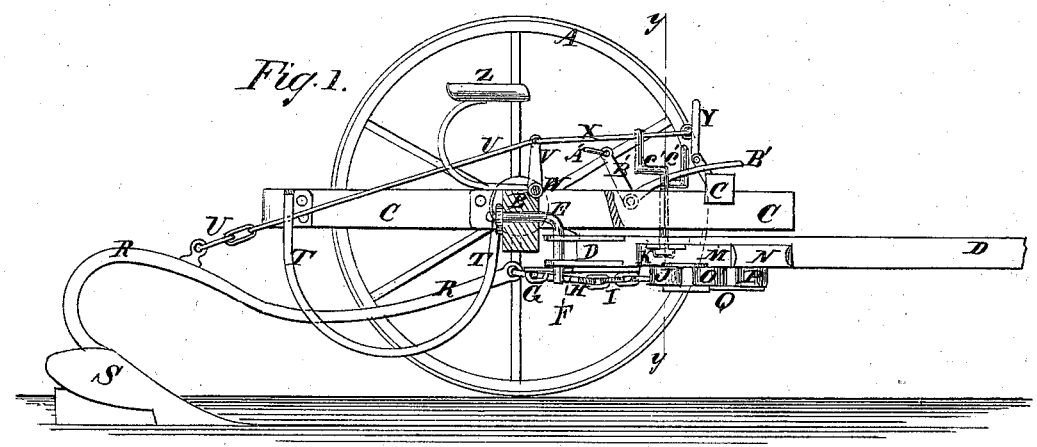
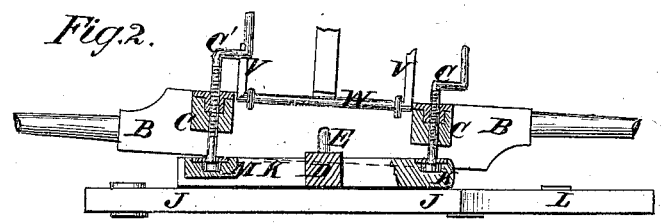
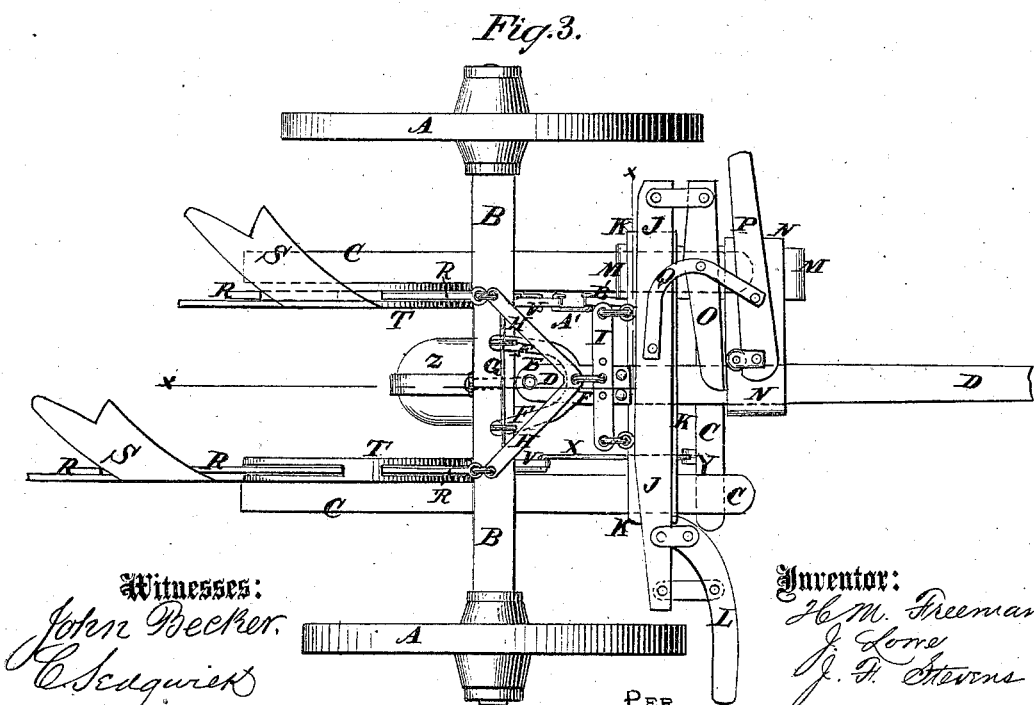

UNITED STATES PATENT OFFICE.

HARLOW M. FREEMAN, JOHN LOWE, AND JOHN F. STEVENS, OF LATHROP, MISSOURI.

IMPROVEMENT IN WHEEL-PLOWS.

Specification forming part of Letters Patent No. 134,878, dated January 14, 1873.

*To all whom it may concern:*

Be it known that we, HARLOW M. FREEMAN, JOHN LOWE, and JOHN F. STEVENS, of Lathrop, in the county of Clinton and State of Missouri, have invented a new and useful Improvement in Wheel-Plow, of which the following is a specification:

Figure 1 is a side view of our improved wheel-plow, partly in section, through the line x x, Fig. 3. Fig. 2 is a detail cross-section of the same taken through the line y y, Fig. 1. Fig. 3 is a bottom view of the same.

Similar letters of reference indicate corresponding parts.

Our invention has for its object to furnish an improved wheel-plow, simple in construction, convenient in use, easily controlled, and effective in operation; and it consists in the combination of parts which are hereinafter described in connection with others necessary to form the complete or operative machine.

A are the wheels, which revolve upon the journals of the axle B, and the one of which that is to run in the furrow is made slightly larger than the other. The axle B is made deep, and the journal that is to receive the furrow-wheel is placed at the bottom, and the other journal at the top of said axle, so that the frame-work, when the machine is at work, may run level. C is the axle-frame, consisting of two side bars secured at their middle parts to the axle B, and connected at their forward ends by a cross-bar. D is the tongue, the rear end of which has plates attached to its upper and lower side, the rear ends of which project, and have a hole formed in them to receive the long vertical arm of the bent rod E, attached to the middle part of the axle B. To the lower side of the rear end of the tongue D is attached a plate, F, from the rear end of which project two arms, which are curved outward and rearward, and to the ends of which are attached keepers, through which passes the rod G. The ends of the rod G are secured to the bar H, near its ends. The bar H is bent at its center at right angles, (or nearly at right angles,) and is pivoted at its angle by a link or clevis to the middle part of the short bar I, several holes being formed in the said bar to receive the said link or clevis, so that the pivoting-point may be adjusted as desired. The ends of the bar I are connected with the bar J by a link connection. The bar J is pivoted to the cross-bar K a little to one side of the tongue D. The end of the longer arm of the bar J, which projects at the opposite side of the tongue D from the pivoting-point of the said bar J, has an arm, L, rigidly attached to it, which projects forward and outward to carry it past the wheel A, and with its outer end is connected the horse that walks upon the unplowed land. The middle part of the bar K is rigidly attached to the tongue D, and to its end, upon the plowed-land side of said tongue D, is rigidly attached the rear end of a short bar, M, which projects forward parallel with the tongue D, and to its forward end is rigidly attached the outer end of the short cross-bar N, the inner end of which is rigidly attached to the tongue D. The bars K M N thus form a rigid frame, rigidly attached to the tongue D. To the end of the other or shorter arm of the bar J is pivoted the outer end of a cross-bar, O, by a link or strap connection. The cross-bar O, at or near its middle point, is pivoted to the short longitudinal bar M. To the longitudinal bar M, or to the cross-bar N, or to both of said bars, is pivoted a bar, P, the end of the inner or shorter arm of which is provided with a small roller, which rests against the inner end of the bar O. With the end of the outer or longer arm of the bar P is connected the horse that walks in the furrow. The connection between the three pivoted bars J O P, and the rigid frame K M N, is strengthened by a strap or bar, Q, attached to the lower ends of the pivots of said pivoted bars. With the rear ends of the arms of the bent or angular bar H, are connected, by a link or clevis connection, the forward ends of the plow-beams R. The plow-beams R are curved downward, upward, and downward, as shown in Fig. 1, and to their rear ends are attached the plows S. T are U-shaped guide-bars, the rear ends of which are attached to the rear ends of the side bars of the frame C, and their forward ends are attached to the said frame C, and to the axle B. The arms of the U-shaped guide-bars T are slotted longitudinally, as shown in Fig. 3, so that the plow-beams may have a free vertical movement while being held against any lateral movement. To the rear parts of the plow-beams R are attached the rear ends of the rods or chains U, the forward ends of which are attached to the ends of the arms V formed upon or attached to the horizontal shaft W that works in bearings attached to the axle B. To one end of the arms of the shaft W is pivoted the end of a connection-rod, X, the other end of which is pivoted to a foot-lever, Y, which is pivoted to the frame C in such a position that it may be reached and operated by the driver, from his seat Z, with his foot. To the other arm, V, of the shaft W, is pivoted a link or short rod, A', which is also pivoted to the end of the bent hand-lever B', which is pivoted at its angle to the frame C.

By this construction the plow can be raised from the ground by operating the foot-lever Y and hand-lever B', either or both. When the plows are fully raised the bent lever B' locks itself and thus holds the plows raised, in which case, by moving the foot-lever Y slightly with the foot, the plows will drop to the ground.

C' are crank or hand screws, which pass through nuts in the forward part of the frame C, and the ends of which are swiveled to the ends of the cross-bar K, so that the tongue and draft bars can be raised and lowered to adjust the draft-line by turning the said screws in one or the other direction, to cause the plows to work shallower or deeper in the ground.

Having thus described our invention, we claim as new, and desire to secure by Letters Patent—

1. The combination of the rigid frame K M N and pivoted draft-bars J, L, O, and P, with each other, and with the tongue D of the machine, substantially as herein shown and described, and for the purpose set forth.

2. The combination of the armed plate F, rod G, bent bar H, and short bar, I, with the tongue D and pivoted draft-bars J, L, O, and P, substantially as herein shown and described, for connecting the plow-beams R with said draft-bars, as set forth.

HARLOW M. FREEMAN.
JOHN LOWE.
JOHN F. STEVENS.

Witnesses:
W. H. P. NORRIS,
E. W. McKIMM.